United States Patent [19]

Higbee

[11] 4,000,759
[45] Jan. 4, 1977

[54] HOSE

[75] Inventor: Charles D. Higbee, Wheatridge, Colo.

[73] Assignee: The Gates Rubber Company, Denver, Colo.

[22] Filed: Dec. 11, 1974

[21] Appl. No.: 531,660

[52] U.S. Cl. .............................. 138/130; 138/103; 138/178

[51] Int. Cl.² ......................................... F16L 11/12

[58] Field of Search .................. 138/103, 130, 178; 174/103, 104

[56] References Cited

UNITED STATES PATENTS

| 2,044,887 | 6/1936 | Laguidara | 138/130 |
| 2,419,053 | 4/1947 | Bennett | 138/130 X |
| 3,117,596 | 1/1964 | Kahn | 138/122 |
| 3,119,415 | 1/1964 | Galloway et al. | 138/103 |
| 3,194,274 | 7/1965 | Griffiths et al. | 138/125 X |
| 3,212,528 | 10/1965 | Haas | 138/130 |
| 3,729,028 | 4/1973 | Horvath | 138/130 |
| 3,866,633 | 2/1975 | Taylor | 138/130 |

FOREIGN PATENTS OR APPLICATIONS

| 1,262,703 | 3/1968 | Germany | 138/130 |
| 1,361,215 | 7/1974 | United Kingdom | 138/130 |

Primary Examiner—Richard E. Aegerter
Assistant Examiner—James E. Bryant, III
Attorney, Agent, or Firm—H. W. Oberg, Jr.; Raymond Fink; Curtis H. Castleman, Jr.

[57] ABSTRACT

A hose having a tube that is reinforced with at least two plies of a plurality of spiralled tubing, the tubing of the first ply oppositely spiralled from the tubing of the second ply.

19 Claims, 6 Drawing Figures

U.S. Patent  Jan. 4, 1977  Sheet 2 of 2  4,000,759
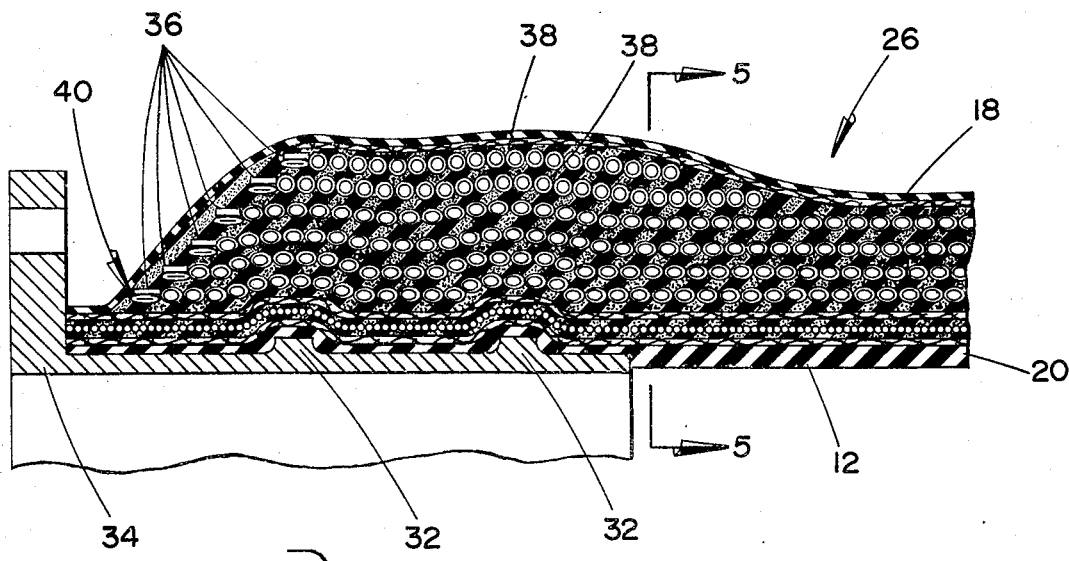
FIG. 4
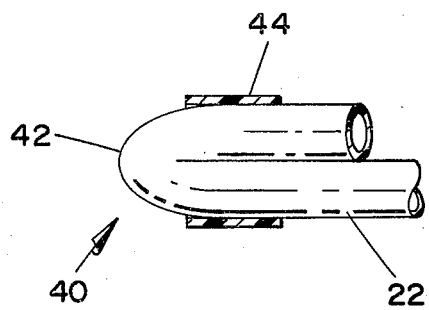
FIG. 6
FIG. 5

HOSE

BACKGROUND OF THE INVENTION

The invention relates to flexible pipes and tubular conduits, but more particularly, the invention relates to flexible hose which includes distinct layers and spirally wound material.

Pressure hose is typically reinforced to overcome longitudinal extension and radial expansion with twined strands, which may be of a textile material, steel wire, or the like; or the reinforcement may be of a sheet-like material such as square woven fabric or cord type fabric. In either case, the reinforcement is applied to provide desired radial and longitudinal strength to a pressurized hose. The lay of the reinforcement is typically chosen to have a minimum affect on hose twisting, or changes in radial and longitudinal dimensions when the hose is pressurized.

Special purpose pressure hoses such as buoyant hose include the typical reinforcements to maintain longitudinal and radial hose dimensions. Additional structure is included to obtain necessary buoyancy. For example, floats may be attached to the hose such as disclosed in U.S. Pat. No. 3,489,182. Other hose designs include integral float chambers filled with a foamed material. An example of such a hose is disclosed in U.S. Pat. No. 3,194,274.

Another type of buoyant hose with integral foam chambers is disclosed in U.S. Pat. No. 3,119,415. In U.S. Pat. No. 3,119,415, a single piece of tubing filled with foam is spiralled around a reinforced hose at a helical angle near 90° in a layer of foam. Such a single ply reinforcement gives radial strength to the hose at radial points of contact therewith but offers very little, if any, longitudinal strength and resistance to twisting in a direction opposite the spiral of the reinforcement.

Such prior art pressure hose constructions have two major disadvantages. First, such pressure hoses are heavier than necessary because the hose is reinforced to withstand pressure using conventional reinforcement techniques. Float systems whether they be built within or attached to the hose, must be sufficiently voluminous and of low specific gravity to off-set the specific gravity of added hose reinforcements to achieve buoyancy.

Second, those hose constructions with unsupported integral foam, allow the foam to be compressed or water logged which negates buoyancy. These hoses typically have an excessive reserve buoyancy to counteract the problem. A reserve buoyancy is demanded by users for the purpose of obtaining extended hose service life.

A type of hose where tubing is used as a float and solely as a radial reinforcement is disclosed in U.S. Pat. No. 3,117,596 and British Pat. No. 1,361,215. One or more pieces of tubing are spiralled laterally adjacent at substantially identical helical angles to form one ply of tubing. Carcass reinforcement plies are necessary to provide longitudinal and twist resistant strength for a pressure type hose. The single ply of tubing acts solely as a radially reinforcement. It cannot act as a twist and longitudinal tension resistant reinforcement.

SUMMARY OF THE INVENTION

In accordance with the invention, a hose is provided with an integral reinforcement of low volumetric specific gravity. In a preferred embodiment, the reinforcement has sufficiently low specific gravity which when averaged with higher specific gravity parts of the hose effects buoyancy. The reinforcement is preferably made of two oppositely spiralled plies of tubing having an acceptable tensile modulus. Conventional reinforcements may also be included in the hose construction for added strength in areas such as collapse resistance.

A primary advantage of the tubing reinforcement of the invention is that it performs two functions. It serves as a primary reinforcement controlling radial and longitudinal expansion, and as an integral float to effect hose buoyancy. The dual purpose reinforcement permits a lighter pressure resistant hose to be constructed and hence, a buoyant hose with low specific gravity.

Another advantage of the invention is that it provides a construction which substantially, if not completely, eliminates the problem of water logging or collapsing integral closed cell foam.

An object of the invention is to provide a lightweight, pressure-type hose assembly having integral float systems which are less susceptible to failure than prior float systems.

Another object of the invention is to provide a method for making pressure hose using tubing as the major radial and longitudinal reinforcement.

Another object of the invention is to provide a flexible buoyant oil suction and discharge hose assembly suitable for use in continuously undulating seas.

These and other objects or advantages of the invention will be apparent after review of the drawings and description thereof wherein:

FIG. 4 is a partially cutaway axial view of a buoyant hose coupling assembly of the invention as taken along the line 4—4 of FIG. 3.

FIG. 5 is an exploded cross-sectional view taken along the line 5—5 of FIG. 4.

FIG. 6 is an enlarged view of FIG. 4 showing sealed reinforcements of the invention.

DESCRIPTION OF THE PREFERRED EMBODIMENT

Figure 1:
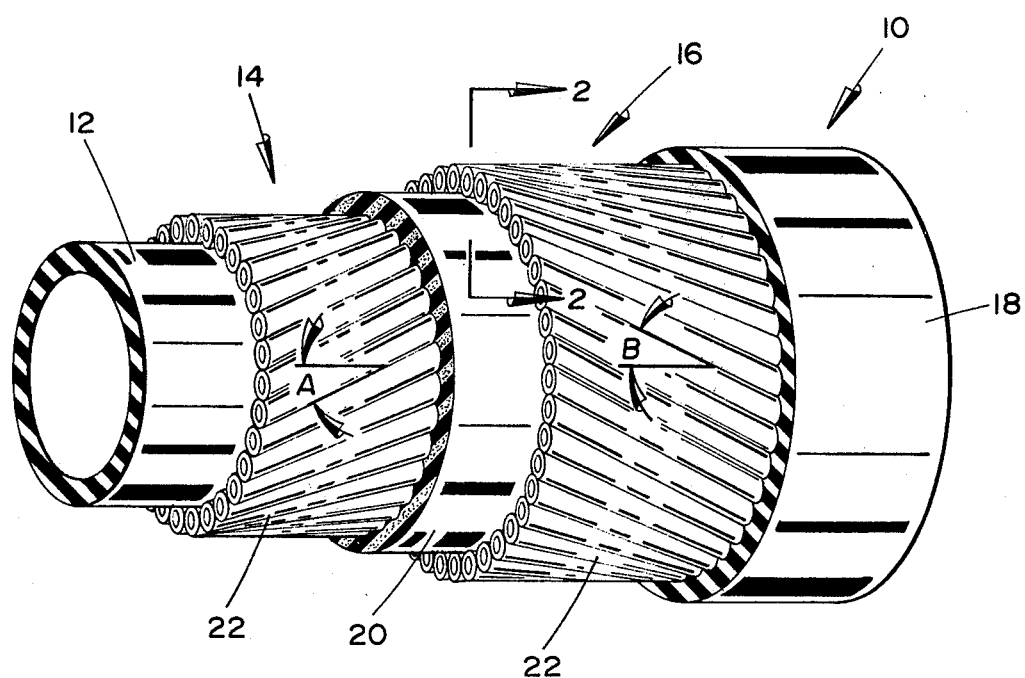
FIG. 1 is an isometric cutaway side view showing a segment of hose of the invention.
Figure 2:
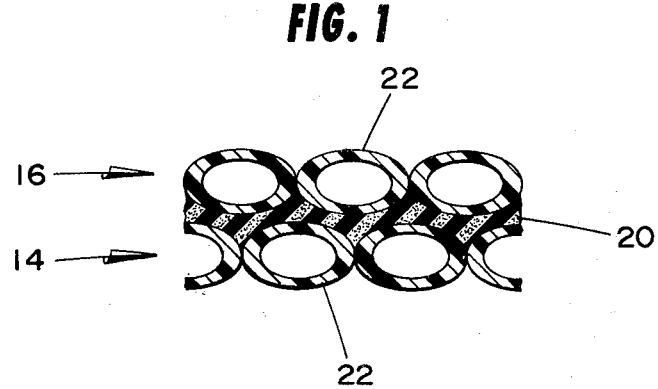
FIG. 2 is an enlarged view taken along the line 2—2 of FIG. 1.
Figure 3:
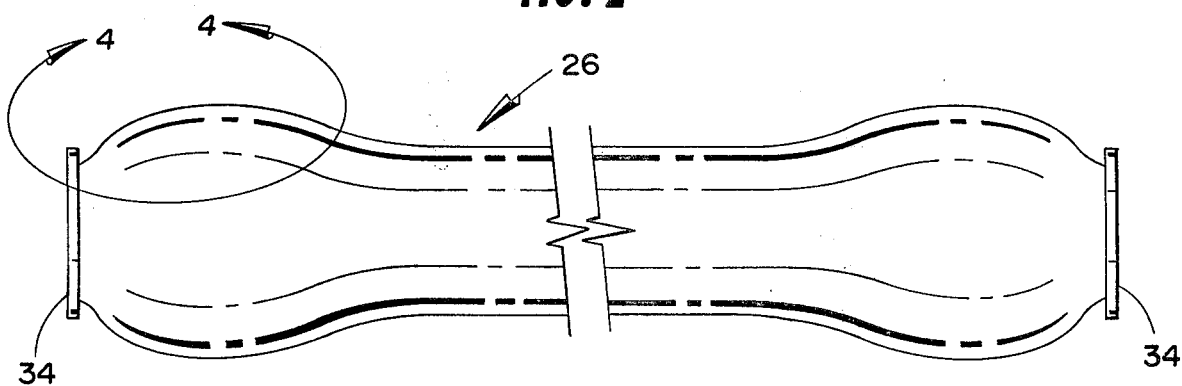
FIG. 3 is an axial side view of a buoyant hose assembly of the invention.

Referring to FIGS. 1 and 2, a pressure type hose 10 is provided according to a preferred embodiment of the invention. The basic hose includes a tube 12, two ply reinforcement 14, 16, and cover 18. Optionally, a friction layer 20 is used between the reinforcement plies to completely embed them. Additional friction plies may be used next to the reinforcement plies for the same purpose. The tube material is chosen to be compatible with the material to be conveyed by the hose. The tube 12 is of an elastomeric material such as the natural or synthetic rubbers or blends thereof, or the tube may be of the plastic type material such as plasticized polyester, nylon, polyvinylchloride, or polyurethane. For example, the tube may be of oil resistant rubber such as neoprene.

A first reinforcement ply 14 of multiple end tubing 22 is spiralled around the tube at a desired helical angle A. A second ply of tubing 22 is spiralled over the first tubing ply at preferably an opposite but equal helical angle B. Tubing 22 is spiralled at any desired helical angle to achieve desired force balances within the hose as is well known in the art. For maximum efficiency of material, both plies of tubing are spiralled at angles of generally 54 degrees to achieve what is known as a "balanced reinforcement". The "balanced reinforcement" assures the minimum weight of reinforcement while also limiting radial and longitudinal expansion of the tube when it is pressurized. The reinforcement plies 14, 16 of tubing 22 are spiralled very close to each other to achieve a "full pack" when maximum reinforcement strength in combination with low density or specific gravity is required.

The tubing material is selected to provide suitable radial collapse resistance, longitudinal flexibility, and tensile strength. Examples of materials with suitable modulus for acceptable use include blocked thermoplastic polyester elastomer such as Hytrel as manufactured by duPont, nylon, or polyurethane. Radial collapse resistance is required so that the tubing will retain its shape when the hose is fabricated or in some cases when in use. Flexibility is required as the tubing must be spiralled around the tube and the completed hose must be flexible for its intended purpose. A suitable tensile strength is required as each individual tubing 22 defines a strand for reinforcing the hose. The diameter of the tubing and wall thickness may be varied to achieve desired collapse resistance, void volume, or tensile strength. Of course, the cross-sectional shape of the tubing need not be round but may be square, rectangular, triangular, etc. as desired. However, the round shaped is preferred for efficient use of material. It is preferred that the tubing have a modulus that is greater than the tube, friction layers, and cover.

The thermal properties of the tubing 22 must also be considered in its selection. The material must remain flexible for various temperature ranges. When rubber is used as the tube material, the melting temperature of a thermoplastic type tubing must be higher than the vulcanization temperature of the rubber.

More plies of reinforcement 14, 16 may be used as desired to effect various degrees of strength in combination with radial cross-sectional density.

A cover 18 is disposed over the outermost ply of tubing and it may include a carcass type reinforcement, not shown.

Optionally, friction layers 20 are interpositioned between the tube, first ply of tubing, and second successive plies of tubing, especially when round tubing is used. The friction layers embedding the tubing provide generally radial support to the tubing when the completed hose is used. Friction layers of light-weight, soft material such as gum rubber or foam enhance flexibility.

Foamed friction layers are possible without the usual detrimental effects of collapsed cells or water impregnated cells. This is because the successive plies of tubing are substantially contiguous to each other to provide the necessary radial support for each other. Foam only fills a small gap 24 between the reinforcement plies. Also, the tubing plies 12, 14 of tubing 22, rather than the friction 20 such as foam, supports the hose. Consequently, the problem of collapsing cells of the foam is substantially, if not completely, eliminated.

The hose 10 may be fabricated using known methods of manufacture such as by wrapped fabrication. Rubber type hose is fabricated using a mandrel. A tube 12 is formed over the mandrel followed by a friction layer 20. The first ply of tubing 22 is spiralled over the friction layer 20 at the preferable angle of 54 degrees 44 minutes. A second friction layer 20, preferably gum rubber or foamed gum rubber is then applied followed by a second ply of tubing 16 oppositely spiralled at preferably 54 degrees 44 minutes. Of course, there will be a greater number of ends of tubing in the second ply as it is of larger diameter. Preferably the tubing 20 is pressurized during the spiralling process to insure that it will not be collapsed as it is spirally bent over the tube or when the hose is cured. The cover is formed over the outermost tubing ply and the entire structure is cured such as with an autoclave. During curing of the rubber compounds, the tubing 22 is pressurized assuring against its collapse. Pressurizing is important when thermoplastic tubing is used because such materials may easily be deformed at rubber curing temperatures (i.e., 250°–300° F).

Referring now to FIGS. 3 through 6, another preferred embodiment of the invention is disclosed in the form of a buoyant hose assembly 26 suitable for use in oil suction and discharge applications such as encountered with filling or emptying oil tankers at sea. The hose portion of the assembly is similar to that as previously described and includes a tube surrounded by carcass plies 28 such as comprising one or more plies of cord fabric or bias fabric. Cords of the carcass may be laid at an angle of generally 54 degrees in relation to the axis of the tube. A friction layer 20 of optionally gum or foamed gum rubber is disposed over a carcass ply 28 and a spiral wire 30 is optionally embedded in the friction layer 20 to enhance tube rigidity for suction applications. Optionally, additional carcass plies are disposed over the wire. Additional friction layers and multiple end tubing are placed over the friction layer in a manner as previously discussed.

The carcass ply 28 evenly loads the reinforcements of wire and tubing under vacuum or pressure conditions. Tubing 22, carcass plies 28, and wire 30 are positioned over radial ribs 32 of the coupling means 34 during the fabrication process. Restraining bands of reinforcement, "tie bands," 36 are then spiralled circumferentially adjacent the ribs restraining the tube fabric and wire reinforcement. The "tie bands" 36 secure the multiple end tubing 22 to the coupling means 34 allowing direct tensioning of the tubing 20 when the hose assembly 26 is pressurized. The oppositely spiralled plies of tubing both radially and longitudinally reinforce the hose.

The specific gravity of the coupling means 34 may be too great for the buoyancy provided by the oppositely spiralled plies of tubing which define reinforcement strands. To compensate for the high specific gravity of the coupling means, one or more plies of "buoying" tubing 38 are generally circumferentially spiralled at high helical angles juxtaposed the coupling means at the outermost ply multiple end tubing 22. The buoying tubing 38 assists the restraining bands 36 in radially securing the multiple ends of tubing 20 to the coupling means; the buoying tubing defines a secondary restraining bands of reinforcement.

To illustrate the effect of the tubing as both a reinforcement and buoy or float chamber, the following example is given. A hose assembly of the above-described construction was fabricated with a 6 inch internal diameter cord fabric reinforced neoprene tube and multiple end (128) spiralled Hytrel tubing having an external diameter of ½ inch, the rubber materials of the hose including gum friction layers having a specific gravity of generally 1.0 to 1.47 and the tubing having an average specific gravity by volume of generally 0.4. Metal components including the coupling means and spiral wire had a specific gravity of generally 6.8 to 8.2 The hose assembly had a maximum diameter of 14 inches near the coupling at the "buoying" tubing and a diameter of 10½ inches in the center portion of the hose assembly where two plies of multiple end, oppositely spiralled tubing were used. The average or effective specific gravity for the hose assembly was 0.7 giving it a 30 percent buoyancy margin. Stated in other words, the tubing occupied approximately ½ of the radial dimension in the middle portion of the hose and ⅔ of the radial dimension near the end couplings to affect a specific gravity of the hose of 0.7.

An advantage of the multiple end tubing construction is that several individually sealed chambers (e.g., 320 ends of tubing) are provided to effect buoyancy. Should a tube leak, it will still provide reinforcement strength although a factor of 1/320th of effective buoyancy is lost. In the above example, 80-85 tubes could leak and the hose would still float with open ends in sea water. Hence, the probability of the hose sinking is substantially reduced with the multiple strand tubing. Of course, larger diameter hose assemblies require more multiple end tubing which further increases the number of individually sealed chambers.

Additional Species

As previously discussed, the tubing is preferably pressurized to prevent its collapse during the fabrication process. The tubing may be heat-sealed at one end, pressurized and heat-sealed at the other end. Optionally, and more preferably, one end 40 of each piece of tubing 22 is folded 42 and a second piece of tubing 44 is placed thereover as shown in FIG. 6. The kinked tubing provides an effective seal during fabrication. The hose is pressurized and the tubing kinked and sealed with the second piece of tubing in a similar manner. The sealed tubing may then be used to fabricate the hose in the manner as above-described.

It is not always necessary to use an even number of plies of multiple end tubing to effect a "balanced" hose construction. Since the tubing is used as a reinforcement, it may be balanced with other types of reinforcements such as twined reinforcements. For example, the longitudinal and radial force resolution of one ply of spiralled cord reinforcement may be balanced with the longitudinal and radial force resolution of oppositely spiralled ply of multiple end tubing reinforcement. Likewise, the force resolution of two plies of the same directionally spiralled multiple end tubing may be balanced against the force resolution of one ply of oppositely spiralled multiple end tubing.

The foregoing detailed description is made for purpose of illustration only and is not intended to limit the scope of the invention which is to be determined from the appended claims.

What is claimed is:

1. A hose comprising:
   a first tube;
   a first ply of tubing comprising a plurality of individual tubes spiralled around the first tube, the first ply of tubing defining a first reinforcement ply;
   a second ply of tubing comprising a plurality of individual tubes oppositely spiralled radially of and over the first ply of tubing and defining a second reinforcement ply; and a cover disposed over the second reinforcement ply.

2. A hose as set forth in claim 1 and further including a friction layer disposed between the first and second reinforcement plies.

3. A hose as set forth in claim 2 wherein the friction layer is a foamed flexible material.

4. A hose as set forth in claim 2 wherein the friction layer is of gum rubber.

5. A hose as set forth in claim 2 wherein a plurality of reinforcement plies of spiralled tubing are disposed between the cover and second ply of tubing.

6. A buoyant hose assembly comprising:
   a first tube;
   a plurality of carcass plies disposed around and secured to the first tube;
   coupling means disposed at each end of the first tube;
   a first ply of tubing comprising a plurality of individual tubes spiralled around the outermost carcass ply, the tubing sealed and having end portions retained to the coupling means;
   a second ply of tubing comprising a plurality of individual tubes oppositely spiralled radially of and around the first ply of tubing, the second ply of tubing sealed and the end portions of the tubing retained to the coupling means, the sealed tubing defining a plurality of reinforcement strands and float chambers; and
   a water resistant cover surrounding the outermost ply of tubing.

7. A hose as set forth in claim 6 comprising friction layers disposed between the tube and first ply of tubing, and between the plies of tubing.

8. A hose as set forth in claim 6 which further includes a spiral reinforcement wire disposed in a friction layer between carcass plies which surround the tube.

9. A hose as set forth in claim 6 comprising additional plies of sealed tubing spiralled over the outermost ply of tubing near the end portions of the tube the additional plies of sealed tubing defining additional float chambers.

10. A hose as set forth in claim 6 wherein the reinforcement strands are spiralled at a helical angle of generally 54 degrees in relation to the first tube.

11. A hose comprising at least:
    a first tube;
    a first ply consisting of a carcass disposed over the tube;
    a second ply consisting of a friction layer disposed over the first ply;
    a third ply consisting of tubing comprising a plurality of individual tubes spiralled around the second ply at generally fifty-four degrees, the third ply defining a plurality of reinforcement strands;
    a fourth ply consisting of a friction layer disposed over the third ply;
    a fifth ply consisting of tubing comprising a plurality of individual tubes disposed over the fourth ply and oppositely spiralled from and radially of the third ply at generally fifty-four degrees, the fifth ply defining a plurality of reinforcement strands.

12. A hose as set forth in claim 11 comprising a spiralled wire disposed in the second ply.

13. A hose as set forth in claim 11 wherein the second ply and fourth ply are of a closed-cell foam material.

14. A hose as set forth in claim 11 wherein the tubing has a radial collapse resistance modulus greater than the first tube, the second ply, fourth ply and cover.

15. A hose as set forth in claim 11 wherein the tubing is a polyester material.

16. A hose as set forth in claim 15 wherein the spiralled tubing is a plastic.

17. In a buoyant hose of the type having a tube and cover, the improvement comprising:
   a reinforcement disposed between the tube and cover comprising at least two radially successive plies of buoyant tubing, the tubing of each ply comprising a plurality of individual tubes helically spiralled, and the tubing of a ply oppositely spiralled in relation to each other.

18. A hose as set forth in claim 17 wherein the tubing is spiralled at a helical angle of generally 54°.

19. A hose as set forth in claim 17 wherein the hose has a radial thickness defined as a radial distance from the interior of the tube to the exterior of the cover and wherein the reinforcement has an average radial thickness equal to at least one-half of the radial thickness to define a hose having a specific gravity that is less than one.

* * * * *